United States Patent [19]

Wegner et al.

[11] Patent Number: 4,540,630
[45] Date of Patent: Sep. 10, 1985

[54] METAL-BACKED LAYERED COMPOSITE AND METHOD OF MAKING SAME

[75] Inventors: Karl-Heinz Wegner, Bad Schwalbach; Erich Hodes, Rosbach; Horst Mann, Wiesbaden, all of Del.X

[73] Assignee: Glyco-Metall-Werke Daelen & Loos GmbH, Wiesbaden-Schierstein, Fed. Rep. of Germany

[21] Appl. No.: 501,776

[22] Filed: Jun. 7, 1983

[30] Foreign Application Priority Data

Jun. 9, 1982 [DE] Fed. Rep. of Germany ....... 3221785

[51] Int. Cl.³ .............................................. B44D 1/09
[52] U.S. Cl. ................................... 428/408; 427/195; 427/201; 428/461; 428/902; 428/903; 428/908.8
[58] Field of Search ............... 428/324, 325, 408, 902, 428/903, 908.8, 457, 460, 461; 427/195, 201

[56] References Cited

U.S. PATENT DOCUMENTS

| 3,623,981 | 11/1971 | Giltrow | 428/902 |
| 3,853,610 | 12/1974 | Byrne et al. | 428/902 |
| 4,189,194 | 2/1980 | Davies | 427/201 |
| 4,304,819 | 12/1981 | Blackwell | 427/195 |
| 4,364,993 | 12/1982 | Edelman et al. | 428/408 |
| 4,366,205 | 12/1982 | Tsukagoshi et al. | 428/408 |
| 4,421,588 | 12/1983 | Davies | 427/195 |

OTHER PUBLICATIONS

Publication "Polyether-Etherketon" (in German) by ICI, Herts, England.

Primary Examiner—John Kittle
Attorney, Agent, or Firm—Karl F. Ross; Herbert Dubno

[57] ABSTRACT

A composite material for use as shock absorber, as bushings or the like having controlled friction characteristics of a layer bonded to a metal substrate is formed by applying a particulate composition of a thermoplastic synthetic resin and carbon fibers having a maximum length of 1 mm to the substrate and heating it to a temperature of 50° to 70° K. above the melting temperature of the synthetic resin.

13 Claims, 3 Drawing Figures

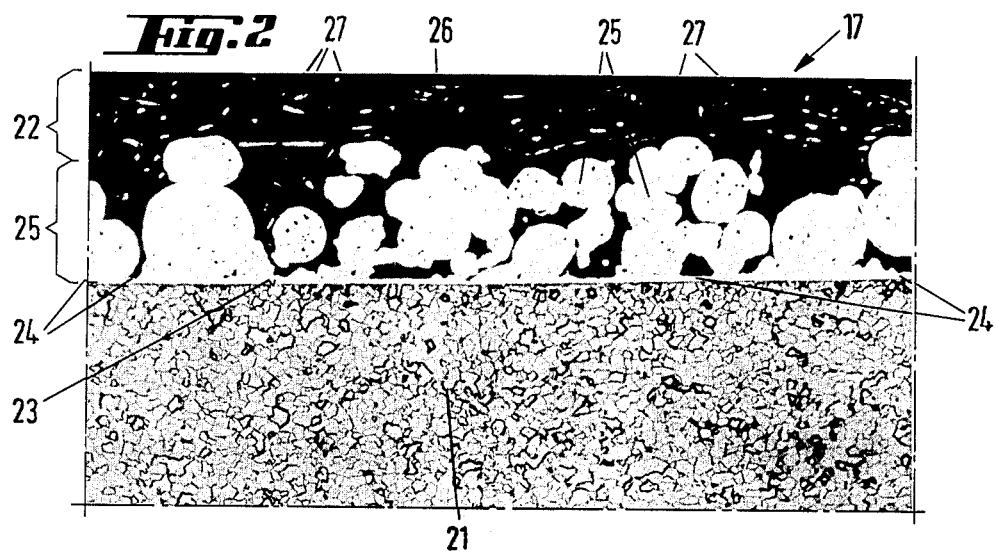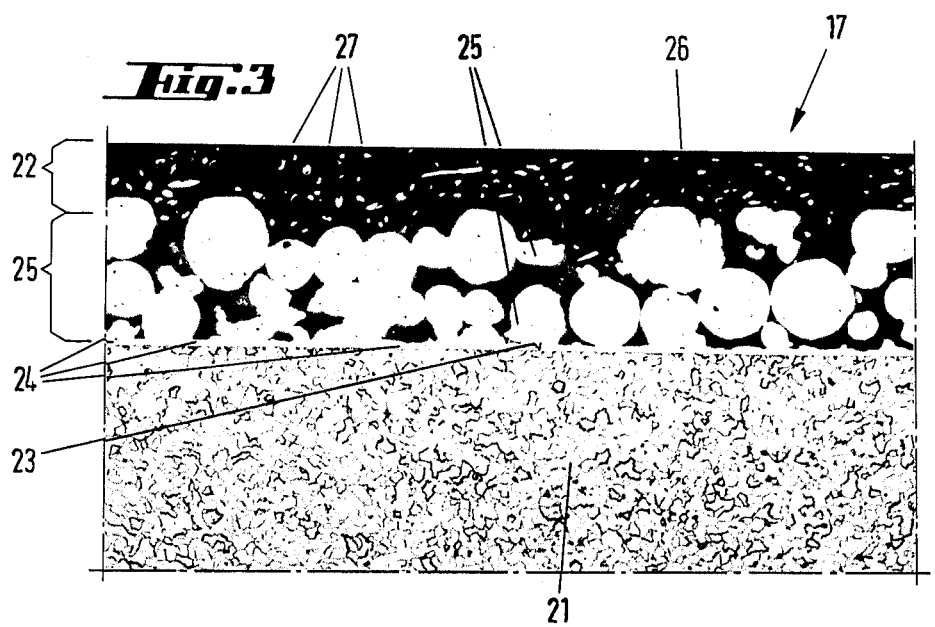

METAL-BACKED LAYERED COMPOSITE AND METHOD OF MAKING SAME

FIELD OF THE INVENTION

Our present invention relates to a metal-backed layered composite material and to a method of making same. More particularly, our invention relates to a bonded material having a metallic support layer and a sliding or friction layer (facing layer) containing short carbon fibers as reinforcing fibers in a matrix of a synthetic resin which can also include various additives for improving the friction or sliding (antifriction) properties of the facing layer.

BACKGROUND OF THE INVENTION

For improved frictional coupling of two members or for sliding bearing (antifriction) purposes, it is known to provide a bonded composite which comprises a supporting metal layer and a facing layer of fiber-reinforced synthetic resin, the latter defining the sliding (friction or antifriction) characteristics of the material.

In German Pat. No. 30 16 041, for example, a bonded composite of the type described whose conventional or facing layer is an organic friction material utilizing a matrix of a phenol-formaldehyde resin which contains 15 to 50% by volume of comminuted carbon fibers with a mean length of 0.2 to 10 mm and a mean diameter of 3 to 50 microns, 7 to 20% by volume steel fibers and 10 to 15% by volume of a filler, generally a particulate solid. Friction layers composed of such friction material suffer premature fatigue under dynamic loading which will vary depending upon the type of synthetic resin matrix and may be traceable at least in part to the inclusion of steel fibers in the synthetic resin matrix.

In German patent publication (open application) No. DE-OS 29 35 205, a layered composite and a method of making it are described in which the synthetic resin matrix has good sliding characteristics and thus forms a highly desirable function layer which also contains short carbon fibers together with practically endless carbon fibers, i.e. carbon fibers of considerable length. The fabrication method described in this publication is complicated and extensive, inter alia, because of the requirement to provide adjacent fiber bundles and because of the means for introducing them and orienting them.

Furthermore, when the system of this publication is used to produce finished products such as journal bushings or sleeves bearing shells and the like, significant variations in quality are recognized. Apparently, when such materials are cut to permit the fabrication of the finished products, the long fibers suffer from shear breakage. Such shear breakage can be discerned upon stamping or other subdidivion of the blanks from sheet or strip workpieces. The fiber fragments upon such breakage appear to project from edges of the blanks and interfere with the ability to effectively use the materials.

OBJECTS OF THE INVENTION

It is the principal object of the present invention to provide an improved composite material which does not suffer from the disadvantages enumerated above and which provides a function layer of long useful life and resistance to fatigue, the material being subdividable without the shear problems discussed above.

Another object of this invention is to provide an improved method of making a composite material with the advantages described.

Still another object of the invention is to provide a layered composite material having a metal support and a function layer provided with a synthetic resin matrix and carbon fiber reinforcement which can be highly loaded and especially subjected to considerable thermal loading, which possesses a high resistance to fatigue especially under hydropulse loading, which has high wear-resistance and bonding stability and yet which can be fabricated especially simply.

Still another object of the invention is to provide a simple and economical method of fabricating such a composite material.

SUMMARY OF THE INVENTION

These objects and others which will become apparent hereinafter in accordance with the present invention in a composite material comprising a metallic support and a function layer or facing layer bonded to this support and comprising a fiber reinforced synthetic resin matrix. We have now discovered, quite surprisingly, that all of the disadvantages enumerated above with respect to the prior art systems can be obviated and the advantages outlined can be obtained if the sole fiber reinforcement for the function layer, i.e. the friction or sliding or antifriction layer, consists of short carbon fibers, i.e. carbon fibers having a length of at most 10 mm and preferably, as noted, a small fraction thereof, while the matrix consists of a thermoplastic synthetic resin or a mixture of two or more thermoplastic synthetic resins selected from the group which consists of polyarylethers, polyarylketones, polyarylsulfides, polyarylsulfones, and polyaryloxides, this function layer being applied to a roughened surface of the metallic substrate and including, if desired, additives for modifying thermal or sliding characteristics generally in the form of particles with a particle size of at most 40 microns.

It is indeed surprising that a matrix of such thermoplastic synthetic resins or two or more such thermoplastic synthetic resins with short carbon fibers and particulate modifiers can allow for high thermal loading since the matrix in which the short carbon fibers and the particles have been dispersed can be applied in a molten form to the previously roughened surface of the substrate and bonded to permitting the matrix to harden on the surface. It is even more surprising that this mode of operation allows the interface between the substrate and the function layer to be practically pore free. Furthermore, the distribution of the short fibers is especially uniform and the method results in an excellent bonding of the short fibers in the synthetic resin matrix.

The short carbon fibers are preferably graphite fibers, i.e. carbon fibers which can be subjected to a combined mechanical and thermal graphitizing treatment which increases the modulus of elasticity. Depending upon the nature of the composite material desired or the articles to be fabricated therefrom, we can incorporate in the function layer graphite fibers with especially high modulus of elasticity or graphite fibers with a comparatively high ductility or extensibility and/or tensile strength.

Best results are obtained, in accordance with the invention when the short carbon fibers make up 20 to 45% by weight of the function layer and when the short carbon fibers have a length of at most 1 mm and a diameter of at most 0.1 mm.

In the best mode embodiment of the invention, the short carbon fibers have a length of 0.04 mm to 0.2 mm and a diameter of 0.005 mm to 0.03 mm.

The thickness of the invention layer is preferably a maximum of 0.1 mm.

According to a highly advantageous embodiment of the invention, the short carbon fibers are dispersed in a polyether-etherketone thermoplastic synthetic resin matrix. The polyether referred to herein is a new aromatic polyether commercially available from I.C.I. Plastics Division.

One of the differences between the conventional layer of the invention and the material of German open application No. 29 35 205 is that the short carbon fibers, preferably graphite fibers, of the invention reduce the coefficient of sliding friction of the composite material to the point that additives to increase or improve the sliding properties of the surface are no longer required.

Nevertheless we can provide, in accordance with the invention, such additives which can include slide lubricants or low friction materials such as polytetrafluoroethylene (PTFE), molybdenum disulfide ($MoS_2$) and the like. Other additives which improve the frictional or sliding characteristics of the conventional layer can include glass meal, i.e. ground glass, and/or mica, preferably synthetic mica.

The substrate of the composite material of the invention, can be anyone of a number of metallic materials, for example, steel, copper, copper alloys such as CuSn8, aluminum and aluminum alloys such as AlZn5SiCuPb, and corresponding cladded materials such as steel clad with an aluminum or aluminum alloy or steel clad with bronze.

The best mode embodiment of the substrate of the invention is a steel strip which is provided with a rough layer in the form of sintered bronze particles of a spheroidal shape. This substrate will be described hereinafter as a porous sintered spherical bronze coated steel workpiece.

As noted previously, one of the important advantages of the present invention is the especially simple process by which the composite material can be formed.

According to the invention, we provide a mixture of the matrix forming synthetic resin particles with the short carbon fibers and, if desired, particles of the friction-modifying additives and apply this mixture to the previously roughened and cleaned (degreased) surface of the metal substrate, the composition being applied in the form of a melt.

According to the invention, the substrate surface has a minimum roughness, i.e. a roughness such that the minimum pit depth is 20 microns (hereinafter referred to as a minimum roughness of 50 microns RT) and the melt is applied continuously thereto and is formed from particles all of which have a particle size of at most 100 microns, the thermoplastic synthetic resin particles consisting of one or more of the thermopastic synthetic resins mentioned.

The composition can be doctored onto the surface using a doctor blade, rake or like tool which also serves to establish the desired thickness of the composition and to orient the fibers.

In the best mode embodiment of the invention, the composition is applied in particulate form and is then melted on the substrate continuously.

The melting of the composition on the substrate can be effected directly after the particular composition has been applied by the doctor blade or rake by heating the composition and/or the substrate to a temperature of 50° to 70° K. above the melting point of the matrix-forming resin or resins.

The doctor blade or rake thus establishes the thickness of the layer in the form of the particulate composition and orients the fibers generally in the direction of advance of the strip before melting and after melting substantially the same thickness and orientation are retained.

The melting of the composition can be effected in a continuous oven through which the strip is passed with the heating being effected from the metal band side such that, at least over a portion of the length of the path in the oven sufficient to permit escape of all bubbles trapped in the melt, the substrate is held at the aforementioned temperature of 50° to 70° K. above the melting point of the resin or resins. This insures, after cooling, a pore-free conventional layer firmly bonded to the metal.

The heating of the substrate or the underside of the composite can be effected by radiant heaters disposed therebelow or the substrate can be heated inductively.

To avoid shrinkage cracks in the composite, the latter is slowly cooled after leaving the continuous oven, at least initially by the effective heated air.

The roughening of the substrate surface can be effected in any conventional way, e.g. by grinding, wire brushing or blasting, especially by blasting with steel particles or silicon carbide (corundum) particles. Preferably the mechanically roughened surface of this type is then subjected to an alkali or organic solvent degreasing e.g. in perchloroethylene or trichloroethylene.

Of course, the roughening can be in the form of an application of particles by sintering to a previously roughened or nonroughened substrate, as previously described.

BRIEF DESCRIPTION OF THE DRAWING

The above and other objects, features and advantages of the present invention will become more readily apparent from the following description, reference being made to the accompanying drawing in which:

FIG. 2 is a microphotograph of the composite material of the invention enlarged 100:1, the section being taken in the longitudinal direction; and FIG. 3 is a similar microphotograph representing a transverse section.

SPECIFIC DESCRIPTION

Figure 1:
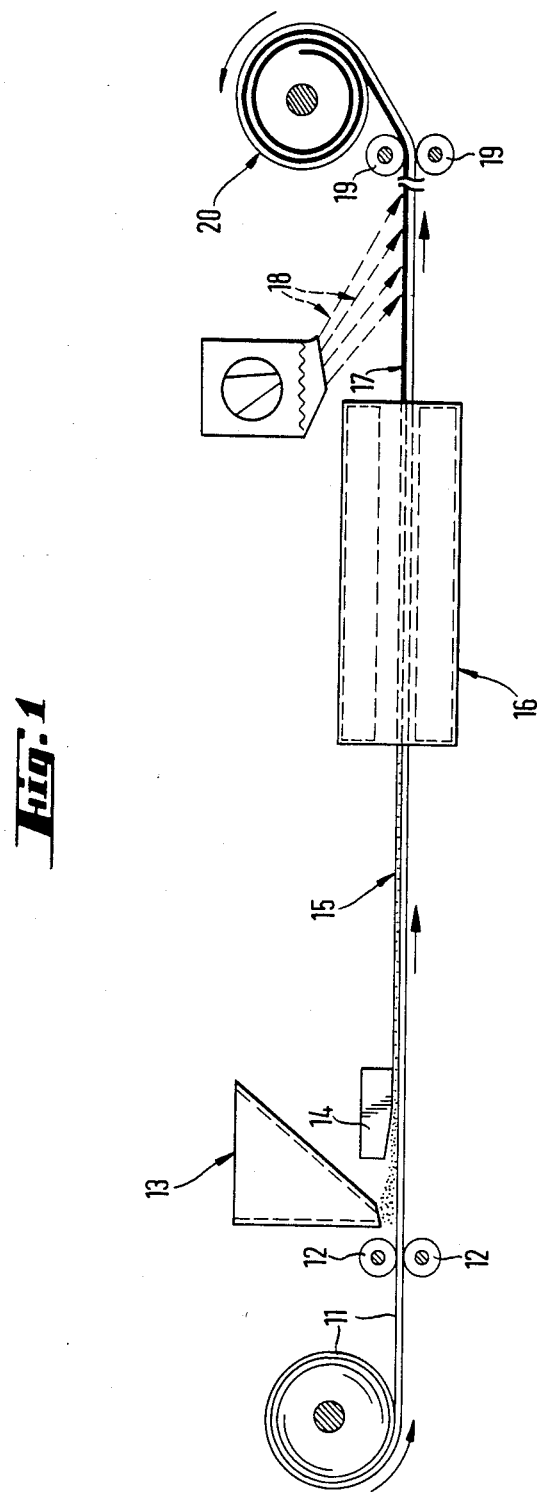
FIG. 1 represents a diagrammatic side-elevational view of an apparatus for carrying out the process of the present invention.

From FIG. 1 it will be apparent that a metal band or strip 11, whose upper surface is copper-coated and provided with a roughened structure in the form of sintered spheroids of bronze bonded to one another and to the steel, is advanced between a pair of rollers 12 beneath a powder hopper 13 from the dry pulverulent composition of the invention is applied to the substrate and doctored thereon as shown at 14 to produce a layer 15.

The powder mixture utilizes a polyether-etherketone thermoplastic synthetic resin of a particle size of at most 100 microns, with which short graphite fibers having a length below 1.0 mm and a diameter between 0.005 mm and 0.03 mm are dispersed. These fibers can be coated prior to the dispersion with thin films of polyamide and/or polyacrylate compounds to promote bonding of the matrix.

The powder mixture can be prepared by milling the polyether-etherketone in liquid nitrogen to the desired particle size range with the carbon fibers then being added and blended with these particles and with any solid additives for improving the frictional characteristics, before the powder mixture is introduced in the hopper.

The doctor blade 14 can be heated and can be formed as a rake beam. The temperature to which this rake beam is heated can be 50° to 70° K. above the melting point of the matrix forming synthetic resin.

The rake beam serves to uniformly distribute the powder mixture over the total breadth of the strip 11 to a uniform thickness and with orientation of the fibers in the direction of advance of the strip. The powder layer 15 is given a thickness which corresponds to the desired final thickness of the facing or functional layer.

The heated rake 14 partly melts the thermoplastic synthetic resin while orienting the fibers so that the fibers are practically prepositioned as the strip enters the continuous sintering oven 16 in which the underside of the band is heated by radiant heating or the band is inductively heated to a temperature of 50° to 70° K. above the melting point of the resin. The furnace environment can be held during heating at a subatmospheric pressure, i.e. the furnace can be evacuated to minimize the trapping of air.

When the band leaves the oven, it is slowly cooled by contacting it with heated air slightly below the temperature in the oven. When the temperature is dropped below the melting point of the resin, the composite material can pass between the rollers 19 and wound up in a coil 20.

When the band is not provided with a sintered layer to form the roughened surface, it may be composed of copper or aluminum based material and can be mechanically roughened as described or by sanding with a sanding belt. The mechanical roughening should provide a minimum roughness of 20 microns RT.

FIGS. 2 and 3 illustrate sections through the composite 17 in which the substrate 21 of steel has a friction layer or sliding layer 22 penetrating within the roughened layer 25 formed of sintered bronze spheroids. The steel was copper coated as represented by the layer 24. The matrix is shown at 26 to penetrate into the interstices of the sintered structure 25 and the short graphite fibers can be seen at 27. FIG. 2 shows the graphite fibers to be more or less oriented in the longitudinal direction while FIG. 3 indicates that they are sectioned transverse to the longitudinal direction.

Instead of the graphite fibers, carbon fibers formed from rayon or bitumen can be used and the graphite fibers can be fabricated from polyacrylonitrile. The graphite fibers have an advantage over other carbon fibers as is well known from the literature that they can withstand higher temperatures and mechanical loading and have a high modulus of elasticity. Depending upon the graphitization process, the fibers can be generated with especially high modulus of elasticity of especially ductility or tensile strength.

Using the composite material formed as described, shock absorber bushings and sleeves were fabricated which were able to withstand high loading and functioned reliably for longer periods than conventional shock absorber sleeves made from composite materials.

The shock absorber sleeves made by the invention and those of noncomposite materials were tested on a hydropulse apparatus under the following conditions:

$h_1 = \pm 40$ mm at 1 Hz
$h_2 = \pm 8$ mm at 12 Hz
stroke $h_1$ is superimposed on stroke $h_2$
Function: Triangular
Speed: $h_1 = 0.16$ m/s $h_2 = 0.40$ m/s
Test duration: 278 hrs.
Load direction changes: $h_1 = 1$ million strokes $h_2 = 12$ million strokes
Total path length: 320,000 m
Lateral loading: over 1 min 690 N over 15 s 3,700 N The test showed that the shock absorber bushings of the invention had a failure rate below 2% while otherwise identical composite materials utilizing the longer carbon fibers of the prior art had a failure rate in excess of 75%.

We claim:

1. A composite material comprising:
   a metal substrate having a roughened surface and
   a facing layer bonded to said surface of said substrate, said facing layer comprising:
   a thermoplastic synthetic resin matrix composed of a polyether-etherketone as the sole resin, and
   as the sole reinforcement in said matrix, short graphite fibers dispersed therein and having a length of substantially 0.04 mm to 0.2 mm and a diameter of substantially 0.005 mm to substantially 0.03 mm, said carbon fibers making up substantially 20 to 45% by weight of said layer.

2. The composite material defined in claim 1 wherein said layer further comprises friction characteristic modifying particles having a particle size of at most 40 microns distributed therein.

3. The composite material defined in claim 1 wherein said layer has a thickness of at most 0.10 mm.

4. The composite material defined in claim 2 wherein said particles are selected from the group which consists of polytetrafloroethylene, moldybdenum disulfide, ground glass and mica.

5. The composite material defined in claim 1 wherein said substrate is composed of a steel, a copper containing metal, and aluminum containing metal or a metal cladded material.

6. The composite material defined in claim 1 wherein said substrate is provided with a sintered bronze layer into which said matrix penetrates.

7. A method of making a composite material which comprises the steps of:
   (a) preparing a composition of particles of a matrix-forming polyether-etherketone thermoplastic synthetic resin having a particle size of at most 100 microns, and short graphite fibers having a length of at most 1 mm by milling the thermoplastic synthetic resin in liquid nitrogen to said particle size, then adding the graphite fibers to the milled resin, and blending said graphite fibers in the milled resin to form said composition such that said graphite fibers are incorporated in said composition in an amount of 20 to 40% by weight and have a length of substantially 0.04 mm to 0.2 mm and a diameter of 0.005 mm to 0.03 mm;
   (b) applying the prepared composition to a roughened surface of a metallic substrate and doctoring said composition onto said surface to form a layer of uniform thickness thereon;

(c) heating said layer to a temperature of substantially 50° to 70° K. above the melting point of the thermoplastic of said layer to transform said layer into a homogeneous coating on said substrate; and (d) cooling said substrate.

8. The method defined in claim 7 wherein said layer is heated as said substrate is passed through a continuous heating oven by heating said substrate.

9. The method defined in claim 8 wherein said layer is cooled by directing heated air thereagainst.

10. The method defined in claim 8 wherein said surface of said substrate is mechanically roughened.

11. The method defined in claim 11 wherein the mechanically roughened surface is degreased.

12. The method defined in claim 8 wherein said roughened surface is formed by sintering a bronze particle layer onto a steel strip.

13. The method defined in claim 8, further comprising the step of admixing into said composition at least one friction-moving additive in particulate form as particles having a particle size of at most 40 microns.

* * * * *